(12) United States Patent
Wang et al.

(10) Patent No.: US 11,789,257 B2
(45) Date of Patent: Oct. 17, 2023

(54) OPTICAL FIBER, OPTICAL FIBER SCANNER AND PROJECTION APPARATUS

(71) Applicant: CHENGDU IDEALSEE TECHNOLOGY CO., LTD., Sichuan (CN)

(72) Inventors: Jiazhou Wang, Sichuan (CN); Chao Chen, Sichuan (CN); Dawei Shen, Sichuan (CN)

(73) Assignee: CHENGDU IDEALSEE TECHNOLOGY CO., LTD., Chengdu (CN)

( * ) Notice: Subject to any disclaimer, the term of this patent is extended or adjusted under 35 U.S.C. 154(b) by 199 days.

(21) Appl. No.: 17/598,764

(22) PCT Filed: Mar. 10, 2020

(86) PCT No.: PCT/CN2020/078583
§ 371 (c)(1),
(2) Date: Sep. 27, 2021

(87) PCT Pub. No.: WO2020/192410
PCT Pub. Date: Oct. 1, 2020

(65) Prior Publication Data
US 2022/0197017 A1      Jun. 23, 2022

(30) Foreign Application Priority Data

Mar. 26, 2019   (CN) .......................... 201910233863.6

(51) Int. Cl.
*G02B 26/10*        (2006.01)
*G02B 6/02*         (2006.01)

(52) U.S. Cl.
CPC .............. *G02B 26/10* (2013.01); *G02B 6/02* (2013.01)

(58) Field of Classification Search
None
See application file for complete search history.

(56) References Cited

U.S. PATENT DOCUMENTS

| 2018/0275396 A1 | 9/2018 | Schowengerdt et al. |
| 2018/0333054 A1 | 11/2018 | Shiba et al. |

FOREIGN PATENT DOCUMENTS

| CN | 101464557 A | 6/2009 |
| CN | 103676142 A | 3/2014 |

(Continued)

OTHER PUBLICATIONS

International search report of PCT Patent Application No. PCT/CN2020/078583 dated Jun. 18, 2020.

(Continued)

*Primary Examiner* — Duane N Taylor, Jr.

(57) ABSTRACT

Disclosed are an optical fiber scanner and a projection apparatus. The optical fiber scanner comprises a housing, an optical fiber enclosed in the housing, an actuator, and projection objective lenses, wherein the optical fiber comprises a fiber core and an inner cladding; the optical fiber is fixed on the actuator, one end of the optical fiber extends beyond the actuator to form an optical fiber cantilever, and a fiber core end face of the optical fiber cantilever is recessed inwards to form a negative focal power, such that an equivalent light-emitting surface of the fiber core end face is reversely focused in the fiber core; and the projection objective lenses are arranged on a light-emitting path of the optical fiber cantilever and are used for focusing and imaging the equivalent light-emitting surface (6).

20 Claims, 3 Drawing Sheets

(56) References Cited

FOREIGN PATENT DOCUMENTS

| | | | |
|---|---|---|---|
| CN | 105816155 A | | 8/2016 |
| CN | 107607174 A | * | 1/2018 |
| CN | 108152883 A | * | 6/2018 |
| CN | 207689756 U | | 8/2018 |
| CN | 207689757 U | | 8/2018 |
| JP | 2007025439 A | | 2/2007 |
| WO | 2008111970 A1 | | 9/2008 |

OTHER PUBLICATIONS

Peng Huang et al., ALL-dielectric metasurface lens based on multimode fiber, SPIE, vol. 10814.
Quanfen Lin, Optical Characteristics of Planar Chiral Microstructures, Harbin Institute of Technology, Jul. 2007.

* cited by examiner

OPTICAL FIBER, OPTICAL FIBER SCANNER AND PROJECTION APPARATUS

The present disclosure claims the priority of Chinese patent application No. 201910233863.6, filed on Mar. 26, 2019 and entitled "Optical Fiber Scanner and Projection Apparatus", which is incorporated herein by reference in its entirety.

FIELD OF THE INVENTION

The present disclosure relates to the field of image display, and in particular to an optical fiber, an optical fiber scanner and a projection apparatus using the optical fiber scanner.

BACKGROUND OF THE INVENTION

The optical fiber scanning technology is a technology for using an actuator to control the swinging of an optical fiber so that light is emitted to illuminate a surface. Such a technology is mainly applied in a fiber scanning display (FSD) device and a fiber scanning endoscope (FSE), and will have advantages of a small scanner volume, a low cost, high brightness, etc.

In the FSD and FSE, there are multiple factors affecting final imaging quality, such as a driving frequency of actuator, a swing of optical fiber, and a spot size of emitting light. The spot size of the emitting light decides the size of a pixel point of an emitting pattern. In an image displayed by the FSD, the smaller the size of a pixel point is, the closer the pixel points can be arranged to each other, and the greater an improvement potential of an image resolution will be. Therefore, a technical problem to be solved in the optical fiber scanning technology is how to reduce the spot size of emitting light.

SUMMARY OF THE INVENTION

In the present disclosure, an optical fiber, an optical fiber scanner and a projection apparatus using the optical fiber scanner may be provided. A fiber core end face of the optical fiber scanner may be designed as being recessed inwardly to form a negative focal power, such that an equivalent light-emitting surface of the fiber core end face can be focused reversely inside a fiber core, and the equivalent light-emitting surface of the fiber core end face can be reduced, thereby reducing the size of a pixel point after passing through projection objective lenses.

In order to address the above mentioned problem, the present disclosure provides an optical fiber scanner, which may include a housing, an optical fiber enclosed in the housing, an actuator, and projection objective lenses. The optical fiber may include a fiber core and an inner cladding; the optical fiber may be fixed on the actuator, one end of the optical fiber extends beyond the actuator to form an optical fiber cantilever, and a fiber core end face of the optical fiber cantilever is recessed inwardly to form a negative focal power, such that an equivalent light-emitting surface of the fiber core end face is focused reversely inside the fiber core; and the projection objective lenses may be arranged on a light-emitting path of the optical fiber cantilever and configured for focusing and imaging the equivalent light-emitting surface. In this way, the projection objective lenses are arranged at an objective distance from the equivalent light-emitting surface, that is, the equivalent light-emitting surface is situated in an objective distance position of the projection objective lenses.

In a preferred implementation, the fiber core end face of the optical fiber cantilever may be an inwardly-recessed curved face.

In an alternative preferred implementation, the fiber core end face of the optical fiber cantilever may be an inwardly-recessed tapered face.

Furthermore, the tapered face may be one of a single tapered cone face, a double tapered cone face, a triple tapered cone face and a gradually tapered cone face.

Furthermore, a cone angle of the inwardly-recessed tapered face of the fiber core end face may be within a range between 100 and 150 degrees both inclusive.

Preferably, in any one of the above implementations, the equivalent light-emitting surface of the fiber core end face refers to a surface on which light spots corresponding to all Rayleigh lengths are overlapped and combined together, where light at different incident angles that passes the inwardly-recessed surface correspond to different Rayleigh lengths.

Preferably, in any one of the above implementations, a microstructure array is arranged on the inwardly-recessed surface of the fiber core end face, the microstructure array forms a metasurface, and the metasurface has a negative focal power due to the arrangement of the microstructure array.

Preferably, in any one of the above implementations, part of the optical fiber of the optical fiber cantilever is a gradient-index (GRIN) optical fiber.

Correspondingly, the present disclosure also provides a projection apparatus, including at least one set of optical fiber scanners according to any one of the above implementations.

Compared with the existing technologies, the present disclosure has the following beneficial effects.

By utilizing the solution provided by present disclosure, a fiber core end face of an optical fiber scanner is designed as being recessed inwardly to form a negative focal power, such that an equivalent light-emitting surface of the fiber core end face is focused reversely inside a fiber core. That is, light emitted from the fiber core end face is focused to form a virtual image inside a fiber core, a projection area of which virtual image is smaller than that of the core end face. Each of the projection objective lenses is configured to focus and image the virtual image, and the virtual image here can be understood as the equivalent light-emitting surface of the fiber core end face, with the equivalent light-emitting surface having a projection area smaller than that of the fiber core end face. In existing technologies, a fiber core end face, which serves as an objective surface of a projection objective lens, will be focused and imaged, whereas in the technical solution of the present disclosure, a fiber core end face may be processed, and thus an equivalent light-emitting surface in a fiber core will be imaged. Therefore, the size of a resulting pixel point will be reduced after focusing and imaging are performed by those projection objective lenses.

BRIEF DESCRIPTION OF THE DRAWINGS

In order to more clearly explain the technical solutions in the embodiments of the present disclosure or in some cases, the accompanying drawings used in the description of the embodiments or in some cases will be briefly described below. Apparently, the drawings in the following description are only some embodiments of the present disclosure. For those of ordinary skill in the art, other drawings can be obtained based on these drawings without any creative work.

DETAILED DESCRIPTION OF THE EMBODIMENTS

The technical solution provided in the embodiments of the present disclosure will be clearly and completely described below in conjunction with the accompanying drawings showing exemplary embodiments of the present disclosure. Apparently, the embodiments described are merely some rather than all of the embodiments of the present disclosure. All other embodiments derived by those of ordinary skill in the art on the basis of the embodiments of the present disclosure without any inventive effort shall fall within the scope of the present disclosure.

The optical fiber scanner provided by the embodiments of the present disclosure is applicable to optical fiber scanners in various scanning modes, such as raster scanning and spiral scanning.

The solution of the present disclosure is described below in details in conjunction with the accompanying drawings.

Figure 1:
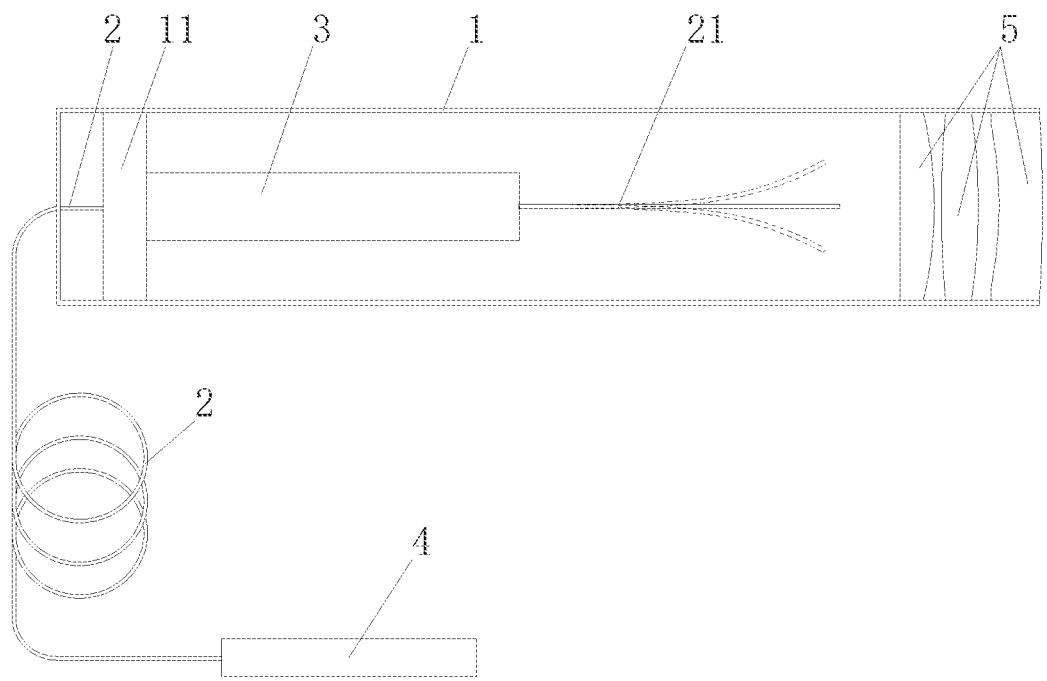
FIG. 1 is a schematic structural diagram of an optical fiber scanner according to an embodiment of the present disclosure.

FIG. 1 is a schematic structural diagram of an optical fiber scanner according to an embodiment of the present disclosure. The optical fiber scanner in an embodiment of the present disclosure includes a housing 1, an optical fiber 2 enclosed in the housing 1, an actuator 3, and projection objective lenses 5. On the actuator 3, the optical fiber 2 is fixed, with one end extending beyond the actuator 3 to form an optical fiber cantilever 21, and the other end connected to a light source 4, where the light source 4 is preferably a laser light source. In FIG. 1, reference numeral 11 represents an actuator fixation support.

Figure 2:
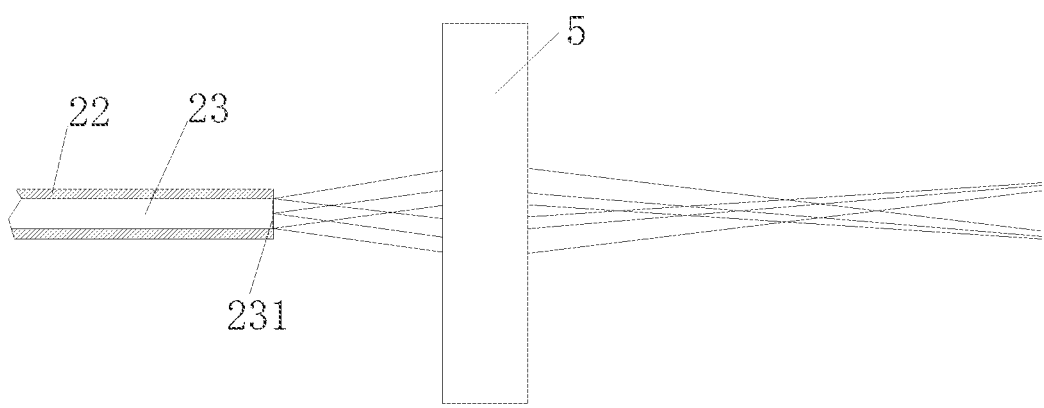
FIG. 2 is a schematic diagram, showing emitting of light in some cases that an optical fiber core end face of an optical fiber scanner is a planar face.

In an existing conventional technique, an optical fiber core end face is a planar face. As shown in FIG. 2, an optical fiber includes a fiber core 23 and an inner cladding 22, and a fiber core end face 231 here is a planar face. By using the projection objective lenses 5, the fiber core end face 231 can be regarded as a planar light source. That is, the fiber core end face in FIG. 2 functions as an equivalent light-emitting surface, and the projection objective lenses 5 perform focusing and imaging on the equivalent light-emitting surface. The size of a pixel point obtained after the focusing is directly related to the size of a core end face, and the pixel point can be equivalent to an image of the fiber core end face imaged through the projection objective lenses. Therefore, if the size of the fiber core end face can be reduced, the size of an emitting light spot can be further reduced. However, during a practical implementation process, a fiber core end face is not able to be limitlessly reduced, because an optical fiber core end face being too small would reduce coupling efficiency of incident light, which is hard to meet a requirement of a system for energy.

Accordingly, the embodiments of the present disclosure propose a fiber core end face of the optical fiber cantilever that is designed as being recessed inwardly to form a negative focal power, such that an equivalent light-emitting surface of the fiber core end face achieves reverse focusing inside a fiber core, thereby reducing the size of the equivalent light-emitting surface. The projection objective lenses are arranged on a light-emitting path of the optical fiber cantilever and are used for focusing and imaging the equivalent light-emitting surface to form small light spots. The form of the fiber core end face according to embodiments of the present disclosure is described below in details in conjunction with FIGS. 3 to 6.

FIGS. 3 to 6 schematically illustrate exemplary inwardly-recessed forms of a fiber core end face of an optical fiber scanner according to embodiments of the present disclosure.

Figure 3:
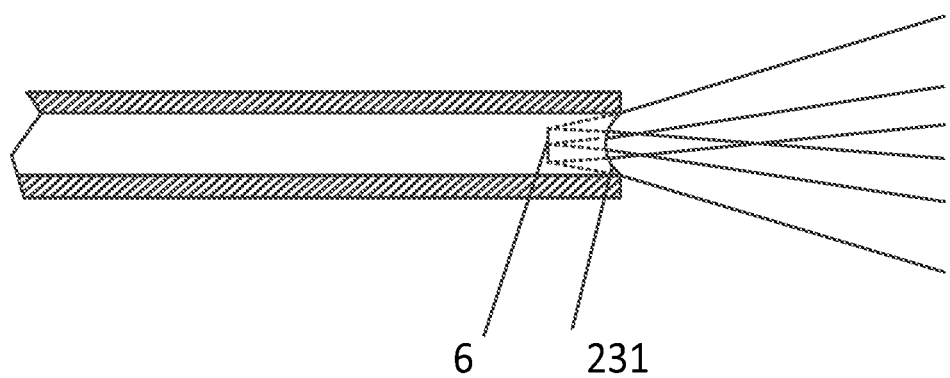
FIG. 3 is a schematic diagram, showing a focusing and imaging process after light emits from an optical fiber at a certain instant moment when the fiber core end face of the optical fiber scanner according to an embodiment of the present disclosure is an inwardly-recessed curved face.
Figure 4:
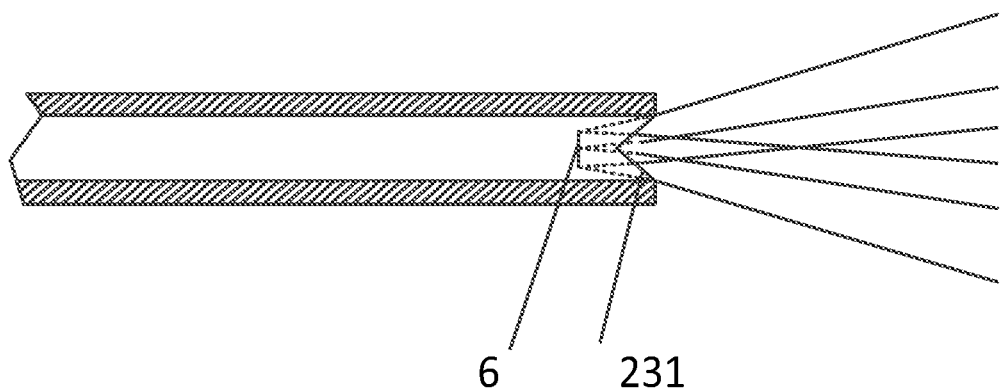
FIG. 4 shows several examples of fiber core end face morphology of an optical fiber scanner when its fiber core end face is an inwardly-recessed curved face according to an embodiment of the present disclosure.

FIG. 3 schematically shows a focusing and imaging process after light emits from an optical fiber at a certain instant moment when the fiber core end face is an inwardly-recessed curved face, and FIG. 4 schematically shows a focusing and imaging process after light emits from an optical fiber at an instant moment when the fiber core end face is an inwardly-recessed tapered face. The inwardly-recessed end face structure has two main functions: 1) enlarging a divergence angle of emitting light, i.e. increasing a numerical aperture thereof; and 2) enabling a light beam to become a Bessel beam, i.e. most of the light being at a high frequency. Therefore, reverse extension lines in all light emitting directions of the Bessel beam can be converged to a rear end of the optical fiber core end face due to the fact that a divergence angle thereof is enlarged, and the resulting spot size is much smaller than the size of the optical fiber core end face. As shown in FIG. 3 and FIG. 4, the inwardly-recessed fiber core end face 231 can emit a light beam having a certain divergence angle. Since the inwardly-recessed fiber core end face 231 has a negative focal power, continuous lines in FIG. 3 and FIG. 4 illustrate approximate travelling directions of light, which is defocused at the fiber core end face 231 and is reversely focused into the fiber core to form a virtual image. Dotted lines illustrate approximate directions of reverse focusing, and the virtual image obtained through the reverse focusing can be understood as an equivalent light-emitting surface 6 of the fiber core end face. The equivalent light-emitting surface 6 in each of the figures is illustrated as a surface, but is generally a dispersed spot in fact. The size of the equivalent light-emitting surface 6 is smaller than the size of a planar equivalent light-emitting surface when the fiber core end face is a planar face. In the embodiments of the present disclosure, when the fiber core end face is recessed inwardly, the projection objective lenses are arranged at an objective distance from the equivalent light-emitting surface 6, that is, the equivalent light-emitting surface 6 is situated in an objective distance position of the projection objective lenses. The projection objective lenses focus and image the equivalent light-emitting surface to form a pixel point, and therefore the size of the pixel point after the focusing is directly related to a cross-sectional area of the equivalent light-emitting surface. In the embodiments of the present disclosure, since the fiber core end face is recessed inwardly to form a negative focal power, the cross-sectional area of the equivalent light-emitting surface is smaller than that of the equivalent light-emitting surface when the fiber core end face is designed as a planar face. Therefore, the size of the pixel point projected onto a projection face can be effectively reduced.

In order to facilitate better understanding of the above-mentioned equivalent light-emitting surface in the embodiments by those skilled in the art, the equivalent light-emitting surface is defined, from a technical perspective, as a surface on which light spots corresponding to all Rayleigh lengths are overlapped and combined together, where light at different incident angles that passes the inwardly-recessed surface correspond to different Rayleigh lengths.

Figure 5:
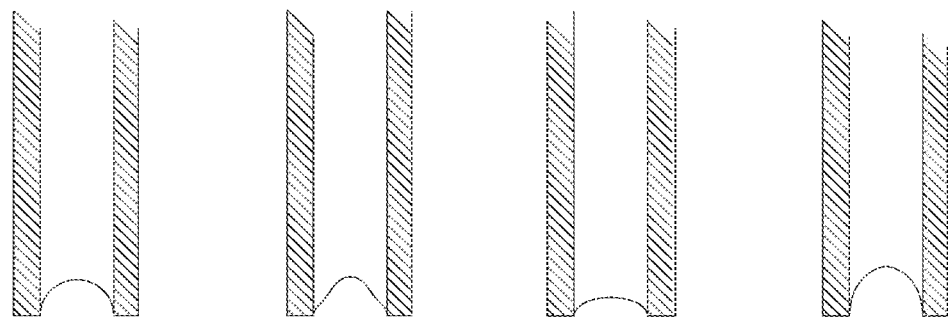
FIG. 5 is a schematic diagram, showing a focusing and imaging process after light emits from an optical fiber at a certain instant moment when a fiber core end face of an optical fiber scanner is an inwardly-recessed tapered face according to an embodiment of the present disclosure.

FIG. 3 schematically illustrates a general form of the fiber core end face being recessed inwardly as a curved face. Moreover, in the embodiments of the present disclosure, an inwardly-recessed curved face can be further formed as an inwardly-recessed spherical surface or aspheric surface. FIG. 5 illustrates several forms of inwardly-recessed curved faces, each of which may be applicable to the embodiments of the present disclosure.

Figure 6:
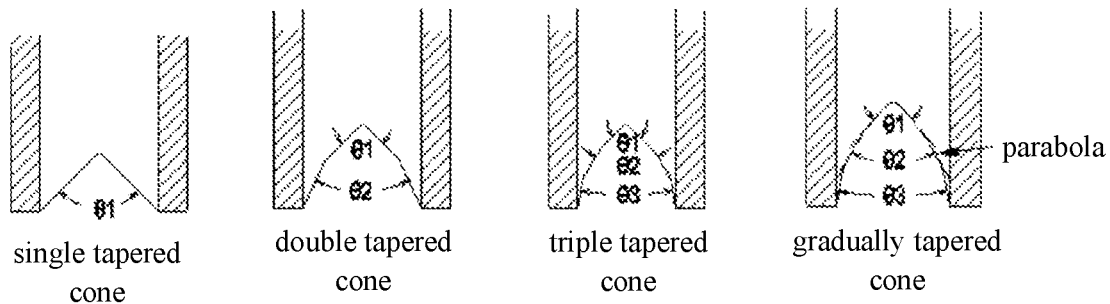
FIG. 6 shows several examples of fiber core end face morphology of an optical fiber scanner when its fiber core end face is an inwardly-recessed tapered face according to an embodiment of the present disclosure.

Similarly, an inwardly-recessed tapered face may also be in several forms as illustrated in FIG. 6, such as a double tapered cone face, a triple tapered cone face and a gradually tapered cone face, in addition to a single tapered cone face as shown in FIG. 4.

In the inwardly-recessed tapered solutions in FIGS. 4 and 6, in order to avoid occurrence of a reverse scattering loss, a cone angle of the inwardly-recessed tapered face of the fiber core end face may be within a range between 100 and 150 degrees both inclusive. Any cone angle applied to the fiber core end face should satisfy this range. For example, in (b) of FIG. 6, both θ1 and θ2 need to satisfy the above-mentioned angle range, and all of θ1, θ2 and θ3 in (c) and (d) of FIG. 6 to satisfy the above-mentioned angle range.

In the embodiments of the present disclosure, in order to simplify process difficulty and to facilitate the corrosion machining of an inwardly-recessed surface, part of the optical fiber of the optical fiber cantilever is preferably a gradient-index (GRIN) optical fiber. The gradient-index (GRIN) optical fiber can also be referred to as a self-focusing optical fiber. The pitch of the self-focusing optical fiber will decide an emitting angle of light, which would directly affect the value of a Rayleigh length. Therefore, during a practical implementation, if a light spot with a size of a certain numerical value as well as calculation and matching of a cone angle and a pitch are expected, it can be realized by means of appropriate adjustment and design of the angle for an inwardly-recessed cone angle, with a pitch being fixed, or can be realized by means of appropriate adjustment and design of a pitch, with a cone angle being fixed, or even can be realized by means of appropriate adjustment and design of the cone angle and the pitch in combination with each other.

Figure 7:
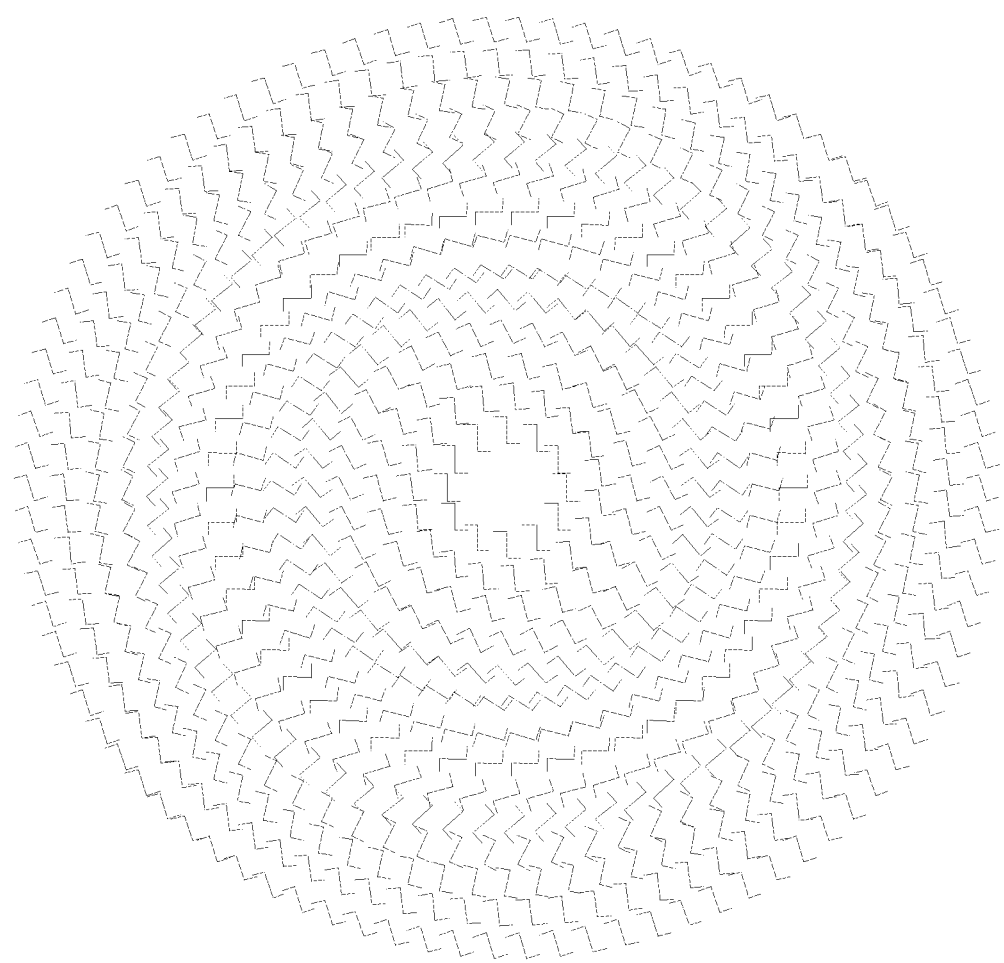
FIG. 7 is a schematic structural diagram of a metasurface that is arranged on a fiber core end face and has a focal power according to an embodiment of the present disclosure.

In another embodiment, in consideration of that a negative focal power brought by an inward recess is still limited for reducing a light spot, a microstructure array may be further arranged on the inwardly-recessed surface of the fiber core end face, the microstructure array may form a metasurface, and the metasurface may then have a negative focal power due to the arrangement of the microstructure array. The metasurface may be a planar chiral array. As shown in FIG. 7, in one implementation, a linear distance between two end points of each microstructure is shorter than the minimum wavelength of a visible light band, which may be 380 nm. The microstructures on the metasurface have different responses (including refractive indexes and absorption coefficients) to polarized light in different modes, and therefore, there is also a difference in phase modulation of a polarization state thereof. A phase delay of the polarized light may be controlled by means of adjusting a rotation azimuth thereof. Therefore, a phase distribution of circularly polarized light through a plane can be controlled by means of changing a spatial distribution of rotation angles of microstructures on the plane. When the phase distribution is equivalent to a phase distribution (a squared phase) introduced by a lens, the plane can have a focal power.

In the present disclosure, as shown in FIG. 7, in two adjacent annular structures, when a difference between angles of respective microstructures that are respectively located in the two annular structures is proportionate to a square error between radiuses of the two corresponding annular structures, a phase distribution introduced by the metasurface can be equivalent to a phase distribution introduced by an imaging lens. Therefore, it is equivalent to introducing a focal power, and it is equivalent to adding an imaging lens to a system.

In one implementation, formulas may be written as:

$$E_{in} = J_{\pm} = \frac{1}{\sqrt{2}}\begin{bmatrix} 1 \\ \pm j \end{bmatrix}$$

$$\begin{aligned} E_{out} &= R(-\Psi) \cdot W(-\pi) \cdot R(\Psi) \cdot E_{in} \\ &= R(-\Psi) \cdot W(-\pi) \cdot R(\Psi) \cdot J_{\pm} \\ &= \begin{bmatrix} \cos(\Psi) & -\sin(\Psi) \\ \sin(\Psi) & \cos(\Psi) \end{bmatrix} \cdot \begin{bmatrix} e^{j \cdot 0} & 0 \\ 0 & e^{-j \cdot \pi} \end{bmatrix} \cdot \begin{bmatrix} \cos(\Psi) & \sin(\Psi) \\ -\sin(\Psi) & \cos(\Psi) \end{bmatrix} \cdot \frac{1}{\sqrt{2}}\begin{bmatrix} 1 \\ \pm j \end{bmatrix} \\ &= e^{\pm j2\Psi} J_{\mp}; \end{aligned}$$

where $E_{in}$ represents an incident light field, $E_{out}$ represents an emitting light field, $J_{+}$ represents a Jones matrix of left circularly polarized light, $J_{-}$ represents a Jones matrix of right circularly polarized light, $R(-\Psi)$ represents a rotation matrix of a space coordinates system, $\Psi$ represents a rotation angle, and $W(-\pi)$ represents a Jones matrix of a half-wave plate. It can be seen from the above formulas that when input light is circularly polarized light, after the light passes through a half-wave plate, emitting light becomes a beam of circularly polarized light in an opposite rotation direction; and a phase related to a spatial azimuth of a fast axis of the half-wave plate is introduced. The phase may also be referred to as a geometric phase or a Pancharatnam-Berry phase, and the method of adjusting and controlling the number of introduced phases by means of changing a spatial azimuth may be referred to as geometric phase adjustment and control. The microstructures on the metasurface are equivalent to a micro half-wave plate (see non-patent reference: LIN, Quanfen, Optical Characteristics of Planar Chiral Microstructures, Harbin Institute of Technology, 2007), and a rotation angle of the microstructures is a spatial azimuth of a fast axis of the half-wave plate. When rotation angles of respective microstructures at different positions on a plane are different, phases introduced by circularly polarized light that passes through the different positions on the plane are also different. Therefore, a phase distribution of circularly polarized light through a plane can be controlled by means of changing a spatial distribution of rotation angles of respective microstructures on the plane. When the phase distribution is the same as a phase distribution (a squared phase) introduced by a lens, the plane can have a focal power.

During operation of the optical fiber scanner in the above embodiments of the present disclosure, as shown in FIG. 1, light that emits from a light source 4 propagates through an optical fiber, and is then focused and imaged through projection objective lenses 5 after emitting from a fiber core end face of an optical fiber cantilever 21. The optical fiber is driven by an actuator 3, the optical fiber cantilever 21 swings in two crossed directions, and during the swinging, the projection objective lenses 5 focus and image the fiber core end face at a tail end of the optical fiber cantilever in all swinging attitudes, so as to form a projection pattern on a projection face within a certain integral time. In the embodiments of the present disclosure, an optical fiber core end face is recessed inwardly, the size of a light spot is reduced, and the size of a single pixel point is thus reduced, such that a projection pattern having the same area can contain more pixels, thereby effectively improving the resolution of the scanning pattern projected by an optical fiber scanner.

The present disclosure further discloses a projection apparatus, which uses the optical fiber scanner as described in the embodiments. The resolution of the projection apparatus can be effectively improved, and high-definition projection can be realized.

The optical fiber scanner in the embodiments of the present disclosure can also be applied to an endoscope in addition to a projection display apparatus. The smaller an emitting light spot is, the larger the density of optical energy at each projection point is, the greater the brightness thereof is, and the better image sampling is facilitated.

All features or steps of all methods or processes disclosed in this description, except mutually exclusive features and/or steps, can be combined in any manner.

Any feature disclosed in this description (including any additional claims, abstract, and drawings), unless otherwise stated, can be replaced by other equivalent or alternative features with similar purposes. That is, unless otherwise stated, each feature is merely an example of a series of equivalent or similar features.

The present disclosure is not limited to the foregoing specific embodiments, but extends to any new feature or any new combination as well as any step of a new method or process or any new combination disclosed in this description.

What is claimed is:

1. An optical fiber, wherein a fiber core end face of the optical fiber is designed as being recessed inwardly to form a negative focal power, such that an equivalent light-emitting surface of the fiber core end face is focused reversely inside a fiber core, wherein the equivalent light-emitting surface has a projection area smaller than that of the fiber core end face.

2. The optical fiber according to claim 1, wherein the fiber core end face of the optical fiber is an inwardly-recessed curved face.

3. The optical fiber according to claim 1, wherein the fiber core end face of the optical fiber is an inwardly-recessed tapered face.

4. The optical fiber according to claim 3, wherein the tapered face is a single tapered cone face, a double tapered cone face, a triple tapered cone face or a gradually tapered cone face.

5. The optical fiber according to claim 3, wherein a cone angle of the inwardly-recessed tapered face of the fiber core end face is within a range of 100 to 150 degrees.

6. The optical fiber according to claim 1, wherein each of equivalent light-emitting surfaces corresponding to light with different wavelengths achieves reverse focusing in a same or a similar position inside the fiber core.

7. The optical fiber according to claim 6, wherein equivalent light-emitting surfaces corresponding to light with different wavelengths have a same or a similar projection area.

8. The optical fiber according to claim 6, wherein the equivalent light-emitting surface of the fiber core end face refers to a surface on which light spots corresponding to all Rayleigh lengths are overlapped and combined together, where light at different incident angles that passes the inwardly-recessed surface correspond to different Rayleigh lengths.

9. The optical fiber according to claim 1, wherein a microstructure array is arranged on the inwardly-recessed surface of the fiber core end face, the microstructure array forms a metasurface, and the metasurface has a negative focal power due to the arrangement of the microstructure array.

10. The optical fiber according to claim 1, wherein equivalent light-emitting surfaces corresponding to light with different wavelengths have a same or a similar projection area.

11. An optical fiber scanner, comprising: a housing, an optical fiber enclosed in the housing, an actuator, and projection objective lenses, wherein
the optical fiber comprises a fiber core and an inner cladding;
the optical fiber is fixed on the actuator, one end of the optical fiber extends beyond the actuator to form an optical fiber cantilever, and a fiber core end face of the optical fiber cantilever is recessed inwardly to form a negative focal power, such that an equivalent light-emitting surface of the fiber core end face is focused reversely inside the fiber core; and
the projection objective lenses are arranged on a light-emitting path of the optical fiber cantilever and are configured for focusing and imaging the equivalent light-emitting surface.

12. The optical fiber scanner according to claim 11, wherein the fiber core end face of the optical fiber cantilever is an inwardly-recessed curved face.

13. The optical fiber scanner according to claim 11, wherein the fiber core end face of the optical fiber cantilever is an inwardly-recessed tapered face.

14. The optical fiber scanner according to claim 13, wherein the tapered face is a single tapered cone face, a double tapered cone face, a triple tapered cone face or a gradually tapered cone face.

15. The optical fiber scanner according to claim 14, wherein a cone angle of the inwardly-recessed tapered face of the fiber core end face is within a range of 100 to 150 degrees.

16. The optical fiber scanner according to claim 11, wherein each of equivalent light-emitting surfaces corresponding to light with different wavelengths achieves reverse focusing in a same or a similar position inside the fiber core.

17. The optical fiber scanner according to claim 11, wherein the equivalent light-emitting surface of the fiber core end face refers to a surface on which light spots corresponding to all Rayleigh lengths are overlapped and combined together, where light at different incident angles that passes the inwardly-recessed surface correspond to different Rayleigh lengths.

18. The optical fiber scanner according to claim 17, wherein a microstructure array is arranged on the inwardly-recessed surface of the fiber core end face, the microstructure array forms a metasurface, and the metasurface has a negative focal power due to the arrangement of the microstructure array.

19. The optical fiber scanner according to claim 17, wherein part of the optical fiber of the optical fiber cantilever close to the fiber core end face is a gradient-index (GRIN) optical fiber.

20. A projection apparatus, comprising at least one set of optical fiber scanners according to claim 11.

* * * * *